Patented Sept. 16, 1952

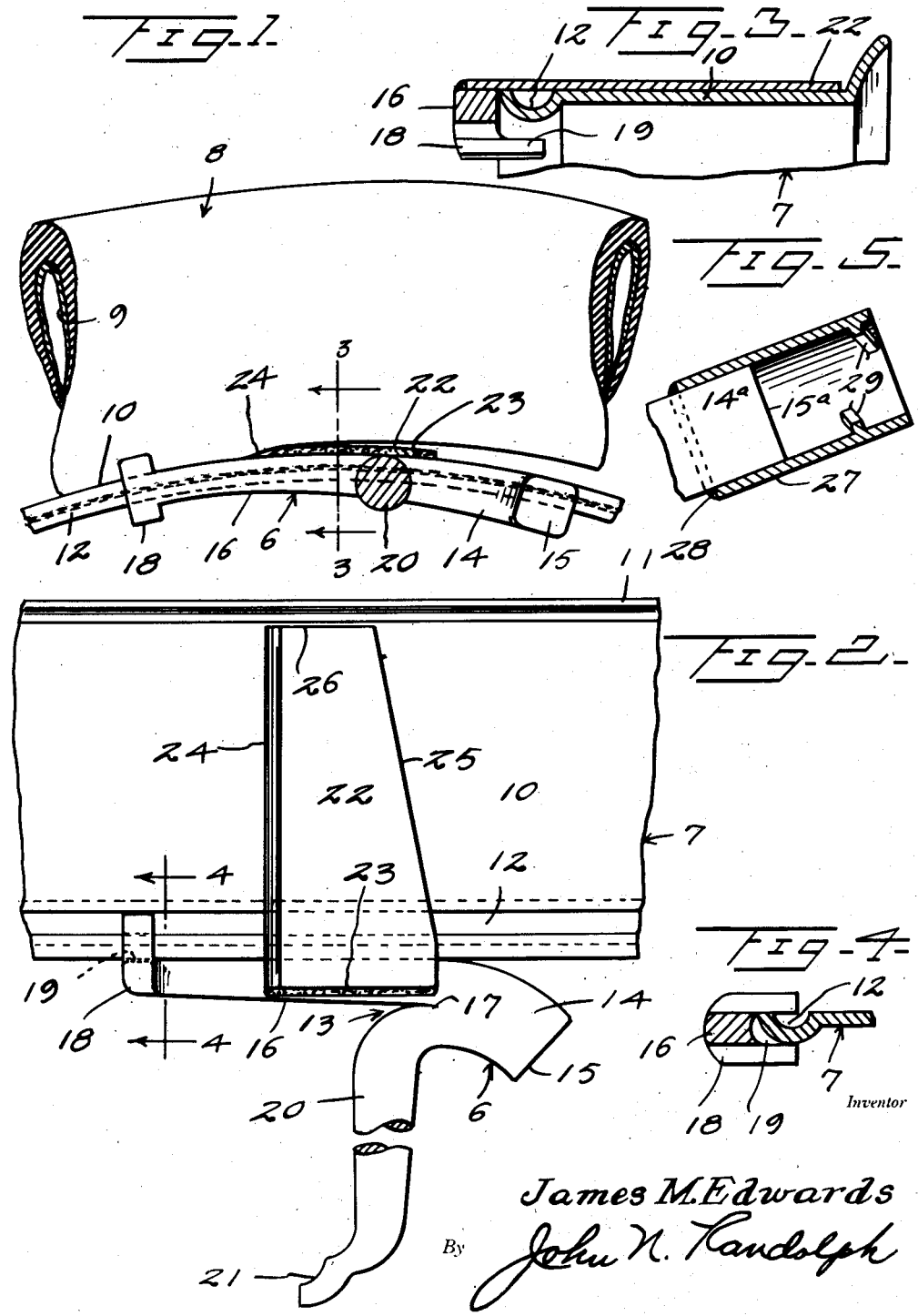

2,610,672

UNITED STATES PATENT OFFICE 2,610,672

CIRCUMFERENTIALLY TRAVELING TIRE BEAD PRYING TOOL

James M. Edwards, Wink, Tex., assignor of one-third to Beaumont B. Wright, Wink, Tex.

Application September 2, 1949, Serial No. 113,775

6 Claims. (Cl. 157—1.22)

This invention relates to a tool for removing a tire from a rim where the tire has become frozen or stuck to the rim by rust or corrosion.

More particularly, it is a primary object of the present invention to provide a tool which is capable of being very readily operated for effectively separating a tire from a rim without damage to the tire, inner tube or rim and wherein rust and other foreign matter will be cut from the rim as the separation is accomplished for reducing the effort required to detach the tire from the rim.

Still a further object of the invention is to provide a tool having means for guiding it in its movement along the outer surface of the rim and along one edge thereof to insure that the tool will be maintained in a proper position with respect to the tire or rim while it is moved circumferentially around the rim by a series of impact strokes.

Various other objects and advantages of the invention will hereinafter become more fully apparent from the following description of the drawing, illustrating a presently preferred embodiment thereof, and wherein:

Figure 1 is a fragmentary plan view showing a portion of a rim and tire as said parts will appear when in a horizontal position and with the tire removing tool shown partly in section and partly in elevation applied thereto;

Figure 2 is a view taken at right angles to Figure 1 with the tire removed and showing a portion of the rim as it would appear in an upright or vertical position and showing the tool in top plan and as it will appear when applied to the rim;

Figure 3 is a cross sectional view taken substantially along a plane as indicated by the line 3—3 of Figure 1;

Figure 4 is a cross sectional view taken substantially along a plane as indicated by the line 4—4 of Figure 2, and Figure 5 is a fragmentary side elevational view, partly in section showing a modification of the tool.

Referring more specifically to the drawing, and first with reference to the form of the invention as illustrated in Figures 1 to 4, for the purpose of illustrating a preferred application and use of the tire removing tool, designated generally 6 and comprising the invention, a portion of a conventional tire rim is illustrated in the drawing and designated generally 7 and a portion of a pneumatic tire 8 is illustrated in Figure 1 and is shown applied to the rim 7; said tire containing the usual inner tube, is indicated at 9. The rim 7 is of the type commonly used on large trucks and wherein the exterior surface 10 thereof is bound on one edge by an upwardly and outwardly curved annular flange 11, forming an integral part of said rim 7 while the opposite edge of the rim is provided with an annular outwardly opening locking ring receiving groove 12.

The tire removing tool 6 includes a body member, designated generally 13, formed of a metal casting having a head portion 14 provided with an outer end 15 forming an impact receiving surface. The body member or casting 13 is preferably split at the opposite end of the head 14 to provide one arm 16 which extends from the inner end 17 of the head 14 to provide a rim engaging guide which is longitudinally bowed, as seen in Figure 1, to conform to the contour of the grooved edge 12 of the rim 7. Said guide member 16 terminates at its opposite, free end in an inwardly extending grooved portion 18 the inwardly opening notch or groove 19 of which is adapted to receive the grooved edge 12 of the rim 7, as best illustrated in Figure 4, so that inwardly extending portion 18 straddles the edge 12 of the rim. A second arm of the body member or casting 13 extends from the inner end 17 of the impact receiving head 14 and is curved away from the guide member 16 to provide a handle 20 which is disposed substantially perpendicular to the guide member 16 and which terminates at its free end in a restricted laterally offset extension 21 which is adapted to be used for removing a split locking ring, not shown, from the ring groove 12. While the handle 20 has been illustrated as being formed integral with the head 14 and guide member 16, it may be welded, forged or otherwise secured thereto.

A blade 22 has one end thereof disposed on the outer or upper side of the guide 16, which constitutes the convex side thereof, and said end of the blade 22 is secured to the guide 16 in any suitable manner as by welding, as seen at 23. The blade 22 projects transversely from the guide member 16 and is disposed in a plane substantially parallel to the handle 20 and projects from the guide member 16 in the opposite direction to said handle 20. The blade 22 is provided with one longitudinal edge which is beveled on its outer or upper side to form a cutting edge 24 and which constitutes the leading edge of said blade when the tool is in operation, as will hereinafter be described. The other, trailing edge of the blade 22 preferably converges outwardly toward the free end of the cutting edge 24, as seen at 25 in Figure 2. The outer end of the blade 22 is substantially straight as seen at 26 and is disposed substantially at a right angle to the cutting edge 24.

Assuming that the rim 7 has been removed from the wheel, not shown, and has been laid on a supporting surface in a horizontal position, as illustrated in Figure 1 and with the grooved edge 12 thereof uppermost, after the locking ring, not shown, has been removed from the ring groove 12 and the removable rim flange, not shown, has likewise been removed, the tool 6 is grasped by the handle 20 and the blade 22 is then forced transversely between the outer surface 10 of the rim and the inner portion of the tire 8 and tube 9 with the outer end 26 of the blade advancing toward the flange 11 as the leading end of the tool 6. This may be accomplished by tapping the tool 6 with a hammer or other impact tool for forcing the blade 22 between the tire and rim. When the tool 6 is fully applied in this manner the guide member 16 will be disposed against the grooved edge 12 of the rim 7 and with its lateral extension 18 straddling a portion of said grooved edge, as illustrated in Figure 4, and the blade 22 will have its outer end 26 disposed adjacent the inner surface of the stationary flange 11. The blade is preferably bowed slightly in a direction transversely of its longitudinal axis, as illustrated in Figure 1, so that the concave or under side of said blade will rest substantially flush against a portion of the outer surface 10 of the rim 7. By then holding the tool 6 with one hand by the handle 20 and striking the surface 15 of the head 14 with a hammer or other suitable impact tool, not shown, the tool 6 may be driven by a succession of impact strokes in a direction from right to left of Figures 1 and 2 for causing said tool to travel completely around the rim 7. As the tool 6 moves around the rim 7 the blade edge 24 will cut or force the tire and tube away from the rim surface 10 and as said edge 24 is disposed against the rim surface 10 it will not cut into the tire or tube but instead will cut any rust or corrosion from the rim surface 10 so as to clean said surface as the tire and tube are disengaged therefrom. After the tool 6 has completed the complete circle of the rim 7 it may be withdrawn from between the rim and tire by an outward pull on the handle 20 and the tire and inner tube may then be very readily removed from the rim 7.

Figure 5 illustrates a slightly modified form of the invention wherein the tire removing tool is modified only to the extent that a sleeve member 27 has one end thereof disposed on the outer end of the tool head 14a and secured thereto as by welding, as seen at 28. The opposite end of the sleeve 27 combines with the impact receiving surface 15a of the head 14a to form a socket for receiving a power hammer, not shown, a portion of which may be interlocked with the sleeve 27 by internally disposed spaced locking ribs 29 of said sleeve.

Various other modifications and changes are likewise contemplated and may obviously be resorted to, without departing from the spirit or scope of the invention as hereinafter defined by the appended claims.

I claim as my invention:

1. A tool for disengaging a pneumatic tire from a rim comprising a head having an outer impact receiving end and an opposite, inner end, a guide member rigidly secured to and extending from a portion of the inner end of said head and adapted to slidably engage an edge of a tire rim, said guide member forming a substantially straight extension of the inner end of the head, a handle projecting from another portion of the inner end of said head and rigidly secured thereto, a blade having one end secured to the guide member adjacent said handle and projecting transversely therefrom and adapted to be inserted transversely between the outer side of said rim and a tire mounted thereon, said blade having a straight scraping and cutting edge extending from end-to-end thereof disposed remote to said head and transversely of the guide member, said blade and handle projecting in opposite directions from the guide member and being disposed in substantially parallel planes.

2. A tool for disengaging a pneumatic tire from a rim comprising a head having an outer impact receiving end and an opposite, inner end, a guide member extending from a portion of the inner end of said head and adapted to slidably engage an edge of a tire rim, a handle projecting from another portion of the inner end of said head, a blade having one end secured to the guide member and projecting transversely therefrom and adapted to be inserted transversely between the outer side of said rim and a tire mounted thereon, said blade having a scraping and cutting edge extending from end-to-end thereof and disposed remote to said head, said blade and handle projecting in opposite directions from the guide member and being disposed in substantially parallel planes, said guide member having a laterally projecting bifurcated portion at its free end extending therefrom in the same direction as said blade for straddling an edge of the rim.

3. A tool for disengaging a pneumatic tire from a rim comprising a head having an outer impact receiving end and an opposite, inner end, a guide member extending from a portion of the inner end of said head and adapted to slidably engage an edge of a tire rim, a handle projecting from another portion of the inner end of said head, a blade having one end secured to the guide member and projecting transversely therefrom and adapted to be inserted transversely between the outer side of said rim and a tire mounted thereon, said blade having a scraping and cutting edge extending from end-to-end thereof and disposed remote to said head, said blade and handle projecting in opposite directions from the guide member and being disposed in substantially parallel planes, said head being curved outwardly in a direction away from the edge of the rim engaged by said guide member.

4. A tool for disengaging a pneumatic tire from a rim comprising a head having an outer impact receiving end and an opposite, inner end, a guide member extending from a portion of the inner end of said head and adapted to slidably engage an edge of a tire rim, a handle projecting from another portion of the inner end of said head, a blade having one end secured to the guide member and projecting transversely therefrom and adapted to be inserted transversely between the outer side of said rim and a tire mounted thereon, said blade having a scraping and cutting edge extending from end-to-end thereof and disposed remote to said head, said blade and handle projecting in opposite directions from the guide member and being disposed in substantially parallel planes, said guide member being bowed longitudinally to conform to the curvature of the edge of the rim engaged thereby, and said guide member having a bifurcated laterally projecting extension at its free end including inner and outer furcations for engaging portions of the inner and outer sides, respectively, of the rim.

5. A tool for disengaging a pneumatic tire from a rim comprising a head having an outer impact receiving end and an opposite, inner end, a guide member extending from a portion of the inner end of said head and adapted to slidably engage an edge of a tire rim, a handle projecting from another portion of the inner end of said head, a blade having one end secured to the guide member and projecting transversely therefrom and adapted to be inserted transversely between the outer side of said rim and a tire mounted thereon, said blade having a scraping and cutting edge extending from end-to-end thereof and disposed remote to said head, said blade and handle projecting in opposite directions from the guide member and being disposed in substantially parallel planes, and a power hammer receiving sleeve secured to said head and projecting from the impact receiving end thereof and combining therewith to form a power hammer receiving socket.

6. A tool for disengaging a pneumatic tire from a rim comprising a head having an outer impact receiving end and an opposite, inner end, a guide member extending from a portion of the inner end of said head and adapted to slidably engage an edge of a tire rim, a handle projecting from another portion of the inner end of said head, a blade having one end secured to the guide member and projecting transversely therefrom and adapted to be inserted transversely between the outer side of said rim and a tire mounted thereon, said blade having a scraping and cutting edge extending from end-to-end thereof and disposed remote to said head, said blade and handle projecting in opposite directions from the guide member and being disposed in substantially parallel planes, and a power hammer receiving sleeve secured to said head and projecting from the impact receiving end thereof and combining therewith to form a power hammer receiving socket, said socket having internally disposed spaced locking ribs.

JAMES M. EDWARDS.

REFERENCES CITED

The following references are of record in the file of this patent:

UNITED STATES PATENTS

| Number | Name | Date |
| --- | --- | --- |
| 221,163 | England | Nov. 4, 1879 |
| 1,192,200 | Howard | July 25, 1916 |
| 1,385,948 | Norlund | July 26, 1921 |
| 1,444,226 | Wallace | Feb. 6, 1923 |
| 1,568,111 | Vidos | Jan. 5, 1926 |
| 1,616,362 | Gagnon | Feb. 1, 1927 |
| 1,741,801 | White | Dec. 31, 1929 |